May 14, 1929. G. F. SHAVE Re. 17,293
REVERSIBLE STUMP JUMP DISK PLOW
Original Filed Feb. 25, 1925
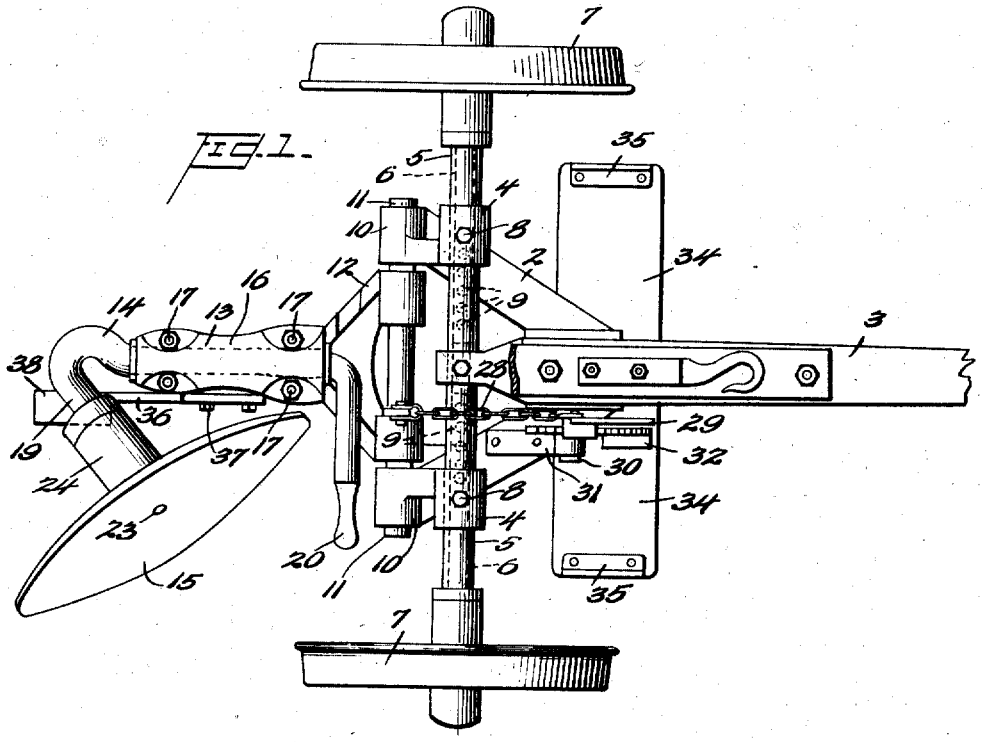
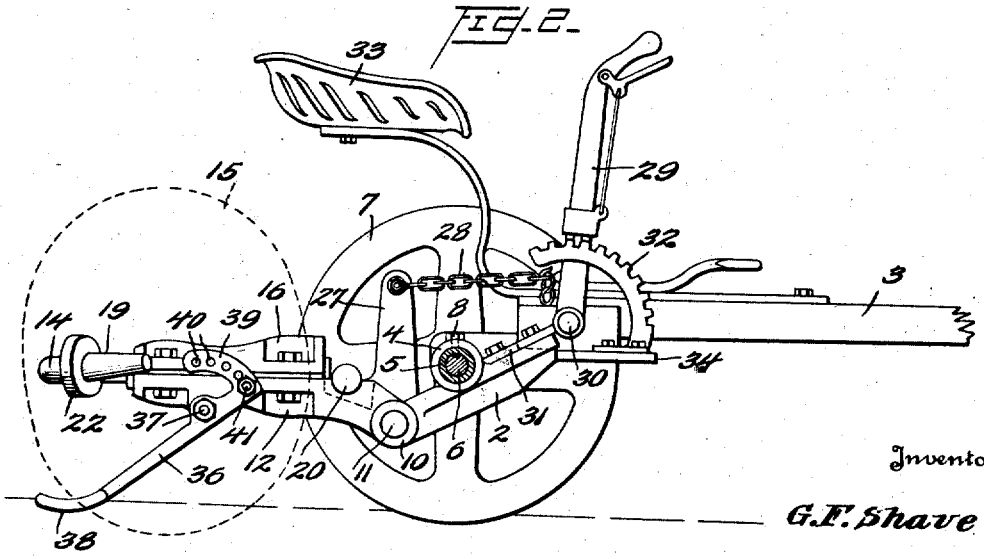
Inventor
G. F. Shave
By C. J. Stockman
Attorney Reissued May 14, 1929. Re. 17,293

UNITED STATES PATENT OFFICE.

GEORGE FREDERICK SHAVE, OF LYNDHURST SOUTH, VICTORIA, AUSTRALIA.

REVERSIBLE STUMP-JUMP DISK PLOW.

Original No. 1,636,079, dated July 19, 1927, Serial No. 11,544, filed February 25, 1925. Application for reissue filed September 29, 1927. Serial No. 222,915.

This invention relates to improvements in and relating to stump-jump disk plows, and it has been devised to provide a disk of light draught and durable construction having, amongst other objects, improved stump-jump mechanism which will be very effective in operation.

To this particular end the invention comprehends a stump-jump mechanism characterized by a correlation of parts such that there is a constant tendency automatically exerted by the weight of the disk and its support adequate to cause the disk to dig into any soil ordinarily encountered, or, more properly speaking, by which the lifting action of the disk when in operation will be obviated and the necessity for the provision of a spring or other means to supplement the weight of the disk and its support in holding the disk to its work in such soils is overcome while at the same time the disk is permitted freely to ride over any stumps or other obstructions; and also to be raised by the operative into transport position or to be set at different selected heights in accordance with the depth of furrow to be produced without calling for the exercise of undue force by the operative.

Further objects are to provide improved means for reversing the disk or disks of the implement and maintaining the same in selected position, means permitting transverse adjustment of the land wheels relatively to the disk or disks to thus regulate the width of furrow and adjusting means associated with the stump-jump arm or arms to regulate the depth of furrow.

With these and other objects in view, the invention consists of the features of construction, combination and arrangement hereinafter described, reference being had to the accompanying drawings, wherein:—

Figure 1 is a view in plan of a reversible stump-jump disk plow according to the invention.

Figure 2 is a sectional side elevation of Figure 1, the disk being shown in broken lines for convenience of illustration.

The implement frame 2 is designed to be of light draught and durable construction, and has rigidly secured thereto a draught pole 3. The frame is provided with a pair of upstanding apertured bosses 4 wherein is stationarily fitted a tubular axle 5.

Telescopically slidable in the opposite ends of said tubular axle are stub axles 6, each of which revolvably supports a land wheel 7. These stub axles are capable of being adjusted longitudinally within the tubular axle 5, and they are locked in required positions therein by set-screws 8 passed through said bosses 4 and engaging selected holes 9, a series of which is formed in each of said stub axles to provide for a variety of adjustments in spacing apart the land wheels 7.

Bosses 10 are also formed on the implement frame and support a horizontal spindle 11 rearwardly of said tubular axle 5. Pivotally mounted on the spindle 11 is a stump-jump arm 12 having a relatively long bearing 13, in which is rotatably fitted a stem or shaft 14 carrying a disk 15. A cap 16 is fitted to the bearing 13 by bolts 17, and its detachment permits the single disk stem or shaft to be conveniently removed, as and when required.

The disk stem or shaft 14 illustrated in Figure 1 has its rear end bent into substantially U-shape to provide a stub axle 19 for the disk, and its forward end is bent at approximately right angles and is fashioned as a hand-lever 20 by means of which the disk 15 can be readily reversed on a horizontal axis within the long bearing 13 provided as a part of the stump-jump arm, and which bearing, as shown, is accordingly substantially horizontal throughout its length.

An upwardly extending arm 27 is formed on or is secured to the stump-jump arm 12, and attached to the upper end of said arm 27 is a chain 28 having its forward end attached to a hand-lever 29. This hand-lever is pivotally mounted on a pin 30 fitted in a bracket 31 that is secured to the plow frame 2, and it is furnished with a trigger lever or a catch of ordinary type to engage with the notches of a quadrant 32. By advancing the pivoted hand-lever, the stump-jump arm 12 is swung upwardly on the spindle 11 and raises the disks 15, which may be elevated above the ground level when required.

It will be noticed that the plane of the member—the spindle 11, in this particular instance—about which the forward end of the stump-jump arm turns axially when the disk is riding over obstructions (and also when it is being adjusted or is being raised or lowered from or into ground working position by the operative) is not substantially higher than the spindle 19 about which the disk rotates while turning the soil. This is essential in order that the disk may be effective in operation when a chain or like means exerting no tension to hold the disk to its work is employed, since it enables the disk to dig into the ground in operation under its own weight. It will be apparent that this weight may be more efficiently utilized by positioning the pivotal point of the front end of the stump-jump arm below the horizontal plane of the axis of the disk, and the drawing shows such an arrangement. In fact, it is noticeable that the pivotal point of the stump-jump arm is as low as may be to avoid rubbish, which is important.

In lieu of the chain 28, I may provide a metal rod or a powerful spring, which upon retraction of the hand-lever 29 will enable sufficient downward pressure to be exerted on the stump-jump arm such as may be necessary to maintain the disk or disks in hard ground being cultivated. It is not my purpose, however, to provide either the rod or the spring herein referred to unless the plow is to be specially equipped for use in soil harder than that usually encountered, and harder than that for which disk plows are ordinarily considered to be practicable.

With respect to the metal rod, I may here state that this should only be used at a time when the capability of the disk to ride over an obstruction is not material. An instance of such use may be recited in the digging of a trench in hard soil. I have found in practice that this plow is capable of such use by the substitution of a stiff rod for the chain, or other flexible connection, the correlation of the axis of the disk and the axis of the pivotal movement of the disk-carrying arm substantially contributing to the capability of the disk to turn the land, since said correlation is such, as already stated, that the tendency is for the disk to dig itself into the ground. I may further here state that the rod is preferably furnished as a separate attachment, when it is desired to provide a plow of simple, practical and comparatively light draft construction adaptable to turn soil for tillage purposes and to dig trenches or the like.

The plow has a seat 33 which may be of ordinary type and a foot-rest 34 which is secured to the plow frame 2 is provided on its upper surface with end stops 35 of angle-section metal.

The adjustment of the land-wheels 7 transversely of the implement by the means herein described provides for the conversion of the implement from a single disk to a double disk plow or vice versa, and furthermore, such adjustment relatively to the disk or disks controls the width of furrow. To adjustably support the rear end of the stump-jump arm, particularly when the plow is being used in boggy soil, and to aid the adjustable hand-lever 29 in regulating the depth of furrow, a skid 36 is pivotally mounted upon a bolt or pin 37 secured to the bearing 13 of the stump-jump arm 12. This skid is constructed having a foot-piece 38 adapted to ride upon, without cutting into, the surface of the ground and thus limits the cutting depth of the disk or disks. The foot-piece 38, as shown, is turned rearwardly and is quite broad so as to avoid any tendency for it to cut into the soil. At the upper end of said skid, there is formed a curved member 39 having a series of adjustment holes 40 to receive a locking stud 41—see Figure 2. By removing the locking stud, the skid can be swung on the pivot bolt or pin 37 to elevate its foot-piece 38 to required height, when said skid is again locked in operative position by inserting the stud into a convenient adjustment.

What I claim as my invention, and desire to secure by Letters Patent is:—

1. A wheeled plow comprising a frame, carrying wheels therefor, a supporting means, a soil working disk revolubly mounted on said supporting means, the supporting means being so pivoted to the frame as to obviate the lifting action of the disk when in operation.

2. A wheeled plow comprising a frame, carrying wheels therefor, a supporting means, a soil working disk revolubly mounted on one end of said supporting means and a pivotal connection between the other end of the supporting means and the frame, located at a lower position than the axis of the disk to thereby obviate the lifting action of the disk when in operation for the purpose stated.

3. A wheeled plow comprising a frame, carrying wheels therefor, a revoluble soil working disk, an arm, an axle member for the disk supported by the rear end portion of said arm, the arm extending forwardly from said member, and a member supported by the frame and upon which the forward end portion of the arm has pivotal movement about a horizontal axis located to obviate the lifting action of the disk when in operation, for the purpose stated.

4. In a wheeled plow, the combination with a frame and its supporting wheels, of a plowing disk, a substantially horizontal stump-jump arm, an axle member for the disk carried by the rear end portion of said arm, and a transversely disposed frame-supported member, said arm having means pivotally connecting its forward end to the frame-supported member on a plane located to obviate the lifting action of the disk when in operation.

5. A wheeled plow comprising a frame, its supporting wheels, a substantially horizontal stump-jump arm, a revolubly mounted soil working disk, an axle member for the disk carried by the rear end portion of said arm, means carried by the frame and upon which the forward end of the arm is pivoted to have movement about a horizontal axis located to obviate the lifting action of the disk when in operation, an adjusting lever carried by the frame, means to hold the lever in adjusted position, a member rising from the stump-jump arm, and a yieldable connection between the lever and said member.

6. A wheeled plow according to claim 1 and in which there is a skid adjustably connected to the rear end of the supporting means and provided with a foot-piece to ride upon the ground.

7. A wheeled plow comprising a frame, carrying wheels therefor, a revolubly mounted reversible soil working disk, and a supporting means for the disk, comprising a stem having a turned rear end on which the disk is revolubly mounted and a member in which said stem is journaled to reverse the disk and having at its end opposite the disk a pivotal connection with the frame located to obviate the lifting action of the disk when in operation and enable the disk automatically to dig into the soil.

8. A wheeled plow comprising a frame having a transverse member, carrying wheels for the frame, a revolubly mounted soil working disk and a supporting means for the disk including a substantially horizontal member and a stem mounted to have pivotal movement about a substantially horizontal axis in said member, said stem having an angularly disposed rear end upon which the disk is revolubly mounted and the end of said substantially horizontal member opposite the disk being down-turned and being pivotally connected to said transverse member, the pivotal connection between the supporting means and the frame being thereby located in a plane lower than that of the axis of the disk, to obviate the lifting action of the disk when in operation, for the purpose stated.

9. A stump-jump disk plow comprising a frame, land wheels supporting said frame, a horizontal spindle carried by said frame, a substantially horizontal stump-jump arm whose forward end is pivotally mounted on said spindle, a stem supported by said stump-jump arm and rotatable therein upon a substantially horizontal axis, an axle member on said stem, arranged in a plane higher than that of the spindle, and a cutting disk on said axle member.

10. A stump-jump disk plow according to claim 9, wherein the forward end of the rotatably mounted stem is bent angularly and is fashioned as a handle for use in reversing the cutting disk mounted at the opposite end of said stem.

11. A disk plow comprising a frame, supporting wheels, a disk-carrying stem extending longitudinally of the plow and provided with a bent rear end, a bearing member in which said stem is mounted and within which it is rotatable upon a substantially horizontal axis, a soil turning disk journaled upon the rear end of said stem, and means by which the bearing member is pivotally supported from the frame, in a position to obviate the lifting action of the disk when in operation.

12. A stump-jump disk plow comprising a frame, land wheels supporting said frame, a horizontal spindle carried by said frame, a substantially horizontal stump-jump arm whose forward end is pivotally mounted on said spindle, a stem supported by said stump-jump arm and rotatable therein upon a substantially horizontal axis, an axle member forming the rear end of said stem, a plow disk on said axle member, an upward extension from the forward end of the arm, a lever to raise and lower the arm and disk, means to hold the lever in its set positions and a connection between said lever and the upward extension from the arm.

13. A stump-jump disk plow comprising a V-shaped frame, bosses on said frame, a horizontal spindle carried in said bosses, a stump-jump arm pivotally mounted on said spindle between said bosses, a long bearing on said arm, a stem rotatably mounted in said bearing, an axle member at one end of said stem, a cutting disk on said axle member, a handle at the other end of said stem for reversing said disk, an adjustable skid carried by the rear end of the stump-jump arm, a hand lever on the frame, an extension on the stump-jump arm and a connection between said extension and said hand lever for raising and lowering the cutting disk.

In testimony whereof I affix my signature.

GEORGE FREDERICK SHAVE.